United States Patent

[11] 3,540,697

[72] Inventor Claudio Matteuzzi
 Via Olmetola no 15/6, I 40132, Bologna, Italy
[21] Appl. No. 802,400
[22] Filed Feb. 26, 1969
[45] Patented Nov. 17, 1970
[32] Priority Feb. 26, 1968
[33] Italy
[31] No. 15392A/68

[54] APPARATUS FOR TESTING THE SUITABILITY OF THE CARCASS FOR RETREADING
4 Claims, 3 Drawing Figs.
[52] U.S. Cl. ................................... 254/50.2, 73/146
[51] Int. Cl. .................................... G01m 17/02
[50] Field of Search ......................... 73/146; 254/50.2, 50.4, 50.3

[56] References Cited
UNITED STATES PATENTS
3,130,957 4/1964 Branick .................... 73/146X Primary Examiner—Donald O. Woodiel
Attorney—Robert E. Burns ABSTRACT: Apparatus having selectively driven parallel rollers for supporting and rotatably driving a tire to be internally examined to determine its suitability for retreading. The tire rests on the roller and its plane is transverse to the axes of the rollers. Pivoted teeth movable toward and away from each other engage the inner walls of the tire while it is being rotated by the support rollers for gripping the tire and opening the tire so that its inside condition can be readily inspected by an operator during its rotation. Mechanism and control circuitry is provided for raising and lowering the parallel rollers relative to the teeth elements to accommodate different size tires and to engage the teeth within the tire. The control circuitry provides for control of the teeth movement toward and away from each other in a plane transverse to the plane of the tires and for control of the rollers. A pin between the rollers applies pressure on the outside of the tire on the tread area thereof in a direction toward the axis of the tire to deflect it inwardly so that cracks and breaks in the carcass may be readily detected.

Fig. 1

APPARATUS FOR TESTING THE SUITABILITY OF THE CARCASS FOR RETREADING

The present invention relates generally to tire inspection apparatus and more particularly to apparatus for checking tire carcasses for suitability for retreading.

It is a common practice to retread or rehabilitate tires whose carcass is in good order or condition. The tires are examined to determine any breaks or weaknesses in the carcass and if the carcass is in a good enough condition a tire may be rehabilitated by retreading. This, of course, is a great saving since retreaded tires in most instances are as good as new tires if the carcass is in good condition when rehabilitated and more particularly tires used at low operating speeds if retreaded are clearly as good as new tires.

Devices for inspection of the carcasses of tires to determine whether they should be rehabilitated or retreaded or discarded are known. These apparatus usually have structure in the apparatus by which the tire is supported but generally it must be manually rotated relative to gripper elements holding the tire and opening it for inspection. Otherwise the gripping elements themselves must be manually operated as the tire is positioned in different angular positions. The known apparatus, therefore, are not equipped to handle very large tires such as those of farm equipment, for example tractors and the like. Furthermore, the known apparatus are limited as to the range of tire sizes that can be inspected in a given apparatus.

It is a principal object of the present invention to provide a new and improved tire inspection apparatus capable of handling a large range of sizes of tires for inspection of their carcasses.

Another object of the present invention is to provide tire inspection apparatus by which the tire is driven rotationally and its sidewalls expanded outwardly during rotation so that the operator is free to carry out inspection without having to carry out manual rotation of the tire and separation of the sidewalls for viewing internally of the tire.

Another object of the present invention is to provide apparatus for applying pressure to the outside of the tire in the area of the treads for compressing the tire carcass radially inwardly so that breaks and cuts in the carcass can be more readily determined.

Apparatus according to the invention comprises two parallel rollers held in fixed positions relative to each other and rotationally driven selectively in a same or opposite directions. The rollers can be lowered and raised jointly relative to gripping elements which are received in the tire and engage the inner walls for separating the inner walls of the tire so that the interior thereof can readily be examined. The gripping elements are constructed as teeth which are movable toward and away from each other under control of control circuitry and in a plane transverse to the plane of the tire.

A pressure-applying pin actuated by fluid pressure is provided for engaging the tread area of the tire to deflect the tire inwardly in order to allow better detection of breaks in the interior of the tire and the carcass thereof.

Other features and advantages of the tire inspection apparatus in accordance with the present invention will be better understood as described in the following specification and appended claims in conjunction with the following drawings in which:

FIG. 1 is a schematic, perspective view of apparatus according to the invention, some portions of which have been broken away and cut away for a better showing of other portions;

Figure 1:
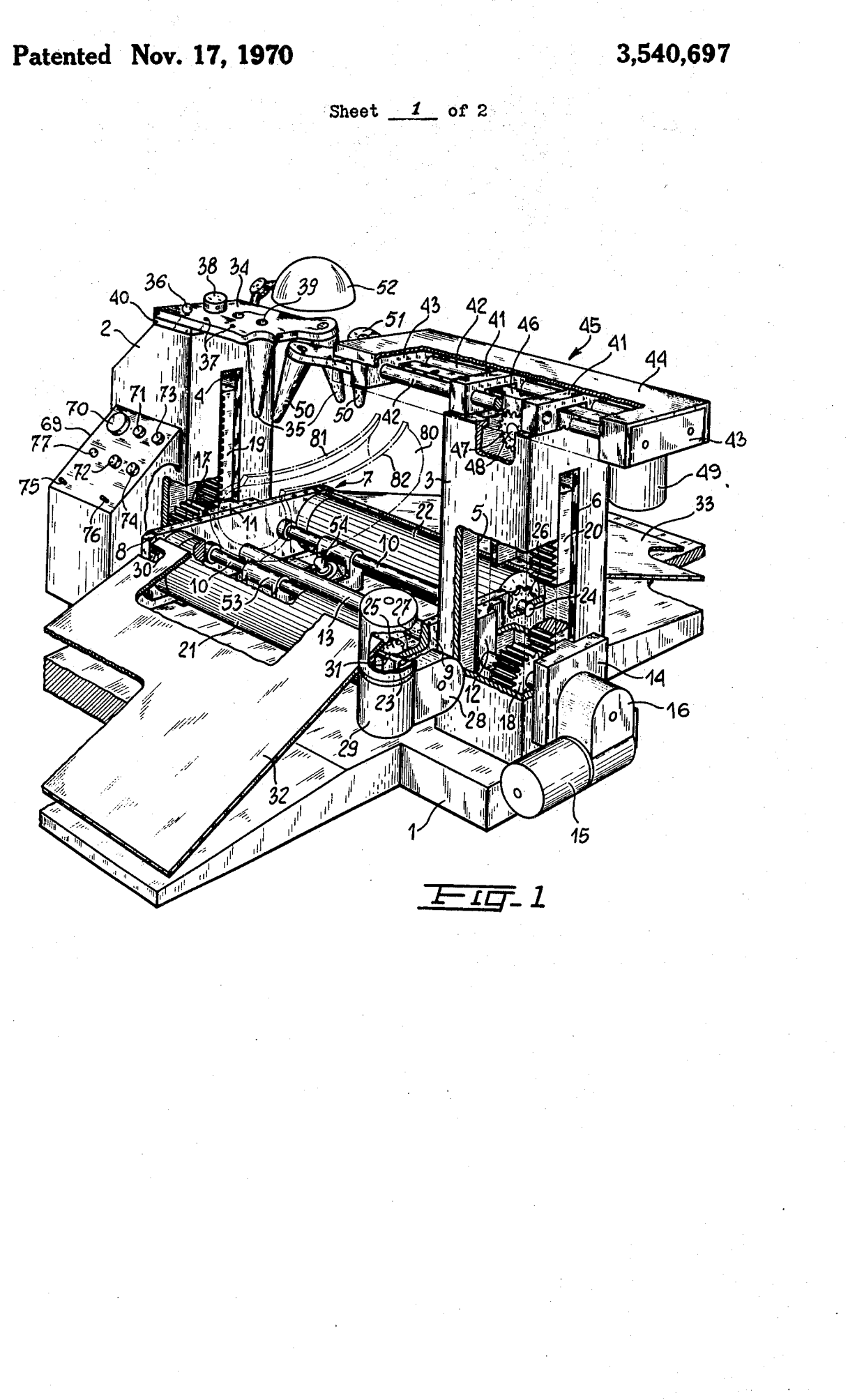
Figure 2:
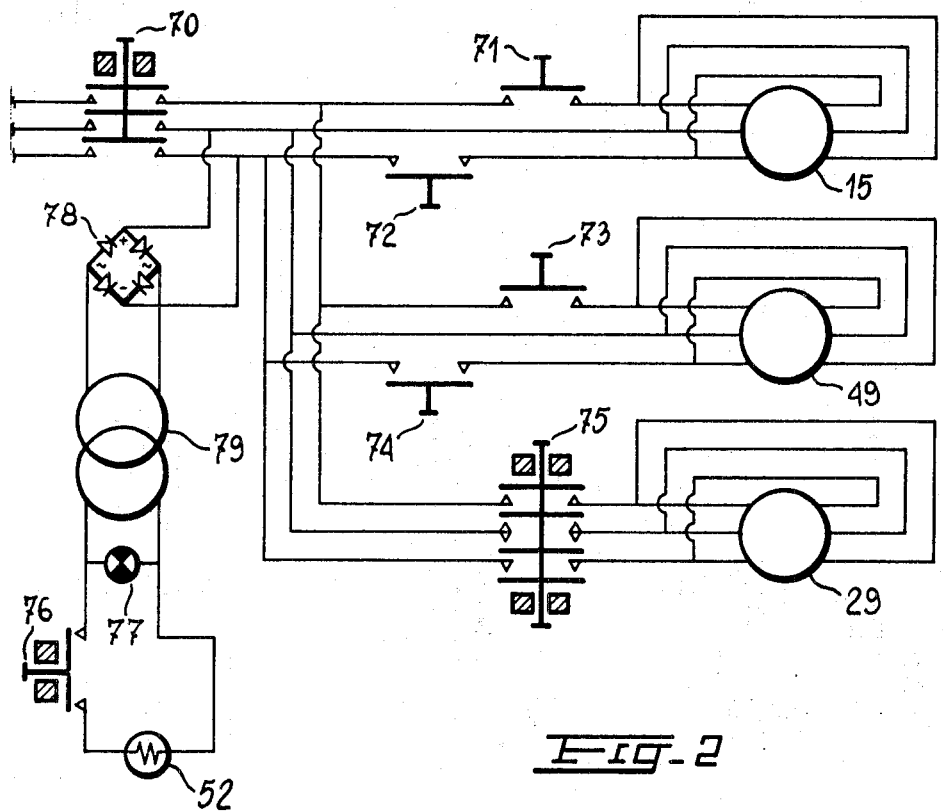
FIG. 2, is a diagram of control circuitry for the apparatus in FIG. 1.

As shown in FIG. 1, the apparatus comprises a casing which in a front elevational view is substantially U-shaped having a base 1 and two vertical uprights or standards 2, 3. The uprights 2 and 3 are of a hollow cross section and in the U-plane thereof have vertical openings respectively designated 4, 5 and 6.

These openings 4, 5 and 6 form vertical sliding guides for a frame, designated as a whole at 7, and comprising two shoulders 8, 9 horizontally extending in side by side relation and firmly interconnected by a pair of horizontal rods 10 parallel to each other. These shoulders 8, 9 are provided with blocks 11, 12 so shaped as to slide in a sliding block fashion within the vertical guide openings 4 and 5, respectively, and carry a shaft 13 extending with one end and through the vertical guide opening 4 within one hollow upright 2 and with the other end passing through the inside of the other hollow upright 3 by penetrating through the vertical guide opening 5 and exiting therefrom through the vertical guide opening 6. The latter end of the shaft 13 carries for free rotation thereof a block 14 which is so shaped as to slide in a sliding block fashion within the vertical guide opening 6 of the hollow upright 3. The block 14 carries an electric motor 15 provided with a reduction gear 16 for transmitting rotary motion to the shaft 13, as later described hereinafter.

Respective pinions 17, 18 are also keyed on shaft 13 and are disposed internally of hollows in the uprights or standards 2 and 3. The pinions 17, 18 mesh with a corresponding rack 19, 20 vertically secured within the spaces of the uprights or standards.

Two freely rotatable horizontal rollers 21, 22 are carried by shoulders 8, 9. On axes 23, 24, respectively, of the rollers 21, 22, and on the side of a shoulder 9, there is keyed a respective sprocket wheel 25, 26. The sprocket wheels 25, 26 are kinematically connected to each other by a chain 27. The end of axis 23 of roller 21 terminates at a reduction gear 28 of an electric motor 29. At the opposite upper ends of the shoulders 8, 9, plates 32, 33 are pivoted by pairs of pins 30, 31. These plates 32, 33 form inclined planes of varying slant or inclination depending on the vertical position of the frame 7 and provide ramps for loading, by rolling thereon, the tires to be tested on the machine, as described hereinafter.

At the top of the hollow upright 2 a cantilever plate 34 is provided horizontally projected to the inside of the "U" casing. At its free end within the "U", this plate 34 is provided with a pair of teeth 35 extending to the bottom of the "U", diverging from each other and converging to the interior of the "U". This cantilever plate is securable above the hollow upright 2 and horizontally adjustable by a reference or positioning pin 36 engageable within holes 37 in the plate and is lockable at the desired adjusted position by a threaded locking member 38 engageable within holes 39 of the plate and screwable to the upper plate 40 of the hollow upright 2.

Two clevis-shaped or bracket-shaped supports 41 are attached on the upper end of the other hollow upright 3. Two horizontal rods 42 are freely slidably carried by the supports brackets 41. These rods 42 have their opposite ends interconnected by cross blocks 43, thus forming a rigid frame completed by a cover plate 44 and designated as a whole at 45. Between the horizontal rods 42 and parallel thereto, the frame 45 carries a rack 46 which at opposite ends thereof is firmly secured to the cross blocks 43. The rack 46 meshes with a toothed pinion 47 keted on an axis 48 of a speed reduction gear 49 which is externally carried by the frame 45. The cross block 43 of the frame 45, facing and nearer the pair of teeth 35, carries a similar pair of teeth 50 secured to a support plate 51 which, in turn, is fast with the cross block 43. Thus, as described hereinafter, the frame 45 can be horizontally moved in both directions moving one pair of teeth 50 toward or away from the other pair of teeth 35.

Figure 3:
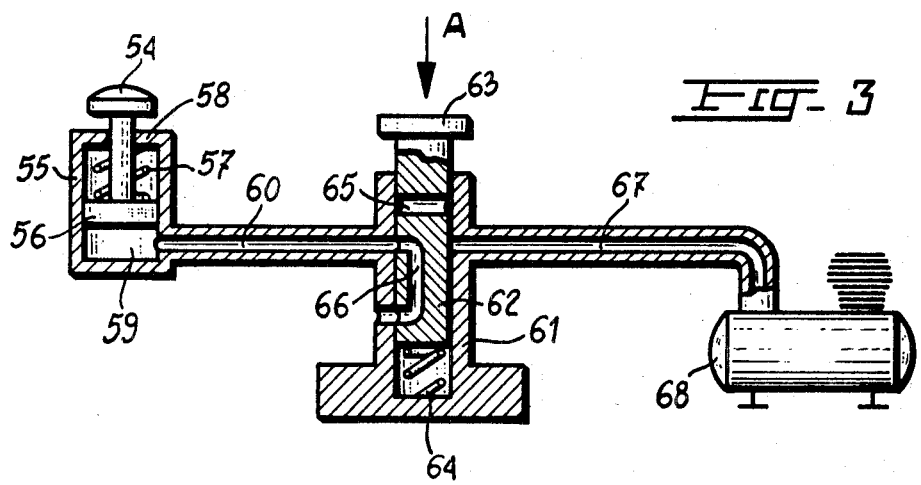
FIG. 3, is a section view of a detail of the apparatus in FIG. 1.

The apparatus is also provided with a lamp holder 52 to aid in operator's test and operations, as better explained below. A support element 53 is secured to rods 10 of the frame 7, in turn this support element 53 carries a moving pin member 54 designed to operate against the outside of the tire being tested, as more apparent in the following description. The moving pin 54 is slidably mounted within a cylinder 55 by, see FIG. 3, a piston-shaped end portion 56 thereof and projects from the cylinder with its other end. A return spring 57 fitted on the moving pin 54 within cylinder 55 acts against the piston portion 56 and the cover or top of the cylinder 55. Thus, a chamber 59 is defined within the cylinder 55. The chamber 59 communicates through a line 60 with a fluid-dynamic distributor having a cylindrical body 61 within which a pin or valve gear 62 is slidably accommodated and manually or pedal operable in a known manner by operating on its outer portion 63 against a return spring 64. The distributor or valve gear 62 is provided with inner passageways 65 and 66, whereas the cylindrical body 61 communicates through line 67 with a drive fluid supply diagrammatically shown at 68.

The apparatus is also provided with a unit for driving and controlling the operation thereof. Thus, in FIG. 2 there is shown the electric operating circuitry, the drive and control members of which are located at a panel or console 60, illustrated in FIG. 1. On this panel there are placed a main switch 70, four normally open pushbuttons 71, 72, 73, 74 for closing and opening multi-contact switches, two changeover switches 75, 76, and an indicator lamp 77.

The function of these members will be more apparent from the disclosure of the apparatus operation with particular reference to FIG. 2, and occurring as follows:

On closing of the main switch 70 by the operator the machine is preset for operation, lighting the indicator lamp 77 as supplied by a current circuit bypassed from the main circuit and through a rectifier 78 and a transformer 79. A lamp 52 is energized upon closing of the changeover switch 76.

The tire to be tested, which is usually a large sized tire and partially shown in phantom in FIG. 1 and designated 80, is rolled along one of the inclined planes 32, 33 to rest on the elongated support rollers, 21, 22 in the position as shown, with its plane lying at right angles to the axes of the support rollers 21, 22. Pushbutton 71 is now depressed, closing a supply circuit to the motor 15. The motor 15 will start to rotate in one of the two directions which, as conventionally assumed, is that direction which through rotation of shaft 13 and related toothed pinions 17 and 18 meshing with the corresponding racks 19 and 20 will move upwardly frame 7 carrying the support rollers 21, 22 for tire 80. By conveniently operating on the pushbutton 71, also through subsequent pulses the tire 80 is raised up to engage the pairs of teeth 35, 50 between its inner edges or rims 81-82. Then, by depressing pushbutton 73, the supply circuit for the motor 49 will be closed. This motor 49 through rotation of the toothed pinion 47 meshing with rack 46 in the direction, as assumed, to move one pair of teeth 50 away from the other pair of teeth 35, will cause the tire to be opened so as to display its interior to the operators for checking visually.

Finally, by operating on the pushbutton 75 so as to close either of the supply circuits for motor 29 causing the latter to rotate in either direction as convenient for the operator (FIG. 2), roller 21 will be rotated through sprocket wheel 25 in the above-defined direction, and accordingly roller 22 will be unidirectionally rotated through chain 27 and corresponding sprocket wheel 26. Thus, while the tire is held open by the pairs of teeth 35 and 50, through the unidirectional rotation of the support rollers 21 and 22 the tire is rotated and the interior thereof is progressively displayed to the operator's or examiner's view.

In order to more effectively verify existence of any fractures in the carcass within the diagram tire a pressure is increasingly exerted on the outside of the tire through the moving pin 54. This enhances the possibility of determining whether is necessary that any of such fractures should be or not be repaired. The operation of the pressure-applying moving pin 54 is apparent from the diagram shown in FIG. 3. Thus, by operating, for example, through a pedal system on control member 63 of the valve gear distributor 62 to cause the valve 62 to slide within the cylindrical body 61 in the direction shown by an arrow A, chamber 59 is connected through the passageways 60, 65 of the valve gear 62, and conduit 67 with the fluid-dynamic supply 68, thus causing moving pin 54 to be moved against the force of the return spring 57. When the pressure on the control member 63 is released the valve gear 62 is restored under control of the return spring 64 to its initial position as shown in FIG. 2, connecting the chamber 59 with the atmosphere through passageway 66 of said valve gear 62. The return spring 57 provides for restoring the moving pin 54 to its inoperative initial position.

Upon completion of a tire test or inspection, the changeover switch 75 is operated so as to cause rotation of the support and drive rollers 21, 22 to be stopped. Then a direction control switch 74 is closed to reverse the direction of rotation of the motor 49, moving the pair of teeth 50 to the pair of teeth 35, thus releasing the tire. Finally, a control pushbutton 72 is depressed to reverse the direction of rotation of motor 15 for lowering the frame and unloading the tire by rolling it on one of the inclined planes 32 or 33.

The above-described embodiment is set forth only by way of example and, therefore, it is apparent that changes and modifications can be made within the scope of the invention as defined in the following claims:

I claim:

1. Apparatus for examining a tire to determine its suitability for retreading and the like comprising means for rotating a tire including, two elongated rollers, means mounting the rollers rotationally and parallel to each other for receiving on the rollers a tire to be examined with the plane of the tire transverse to the rollers, a pair of grippers movable toward and away from each other received in the tire for separating the side walls of the tire from each other to allow better viewing of the interior of the tire, means to raise and lower the means mounting the rollers for raising and lowering the rollers relative to said grippers thereby to move a tire being inspected toward and away from said grippers, means for moving the grippers toward and away from each other in directions substantially normal to the plane of the tire, and control means to control upward and downward movement of said rollers and movement of said grippers.

2. Apparatus according to claim 1, including means under control of said control means to drive said rollers rotationally jointly and independently.

3. Apparatus according to claim 1, in which said grippers each comprise a pair of pivoted teeth spaced from each other and extending downwardly.

4. Apparatus according to claim 1, including means movable jointly with said rollers upwardly and downwardly defining ramps for rolling said tire on to said rollers and off of said rollers.